(12) United States Patent
Chan

(10) Patent No.: US 9,015,629 B2
(45) Date of Patent: Apr. 21, 2015

(54) CONTENT MANAGEMENT SYSTEMS AND METHODS

(71) Applicant: Lap Chan, Daly City, CA (US)

(72) Inventor: Lap Chan, Daly City, CA (US)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 13/661,687

(22) Filed: Oct. 26, 2012

(65) Prior Publication Data

US 2014/0123068 A1    May 1, 2014

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0486* | (2013.01) |
| *G06F 3/0488* | (2013.01) |
| *H04M 1/725* | (2006.01) |

(52) U.S. Cl.
CPC .......... *G06F 3/04817* (2013.01); *G06F 3/0482* (2013.01); *G06F 3/0486* (2013.01); *G06F 3/04886* (2013.01); *H04M 1/72519* (2013.01)

(58) Field of Classification Search
None
See application file for complete search history.

(56) References Cited

U.S. PATENT DOCUMENTS

| | | | | |
|---|---|---|---|---|
| 7,388,578 | B2 * | 6/2008 | Tao | 345/173 |
| 2004/0165013 | A1 * | 8/2004 | Nelson et al. | 345/858 |
| 2007/0252822 | A1 * | 11/2007 | Kim et al. | 345/173 |
| 2008/0158189 | A1 | 7/2008 | Kim | |
| 2009/0249240 | A1 | 10/2009 | Lundy et al. | |
| 2011/0107262 | A1 * | 5/2011 | Kuenzner et al. | 715/822 |
| 2011/0312389 | A1 | 12/2011 | Hyun et al. | |

FOREIGN PATENT DOCUMENTS

EP    2189889 A1    5/2010

OTHER PUBLICATIONS

"European Application Serial No. 13190024.3, Search Report mailed Jan. 30, 2014", 6 pgs.

* cited by examiner

*Primary Examiner* — Matt Kim
*Assistant Examiner* — Mahelet Shiberou
(74) *Attorney, Agent, or Firm* — Schwegman Lundberg & Woessner, P.A.

(57) ABSTRACT

Example systems and methods of managing content are described. In one implementation, a method accesses a first set of data, a second set of data, and menu data. The menu data is associated with multiple menu actions relevant to the first set of data and the second set of data. The method generates display data that allows a display device to present the first set of data, the second set of data, and the menu to a user such that the menu is positioned between the first set of data and the second set of data. The method receives a user selection of a menu action and, based on the user selection, generates a graphical object that allows the user to indicate whether to apply the selected menu action to the first set of data or the second set of data.

20 Claims, 9 Drawing Sheets

CONTENT MANAGEMENT SYSTEMS AND METHODS

FIELD

The present disclosure relates generally to the management of data and, more specifically, to managing the display of content to one or more users,

BACKGROUND

Computing systems and application programs display various types of content to users via a display device. In some situations, a user interacts with the displayed content to view information of interest to the user. In some situations, a use may want to display two different sets of data or two different types of data at the same time. Depending on the size of the display device and the amount of data displayed the display device may not be capable of displaying all of the content to the user simultaneously, in this situation, it is desirable to provide as much data as possible to the user based on the size of the display device.

BRIEF DESCRIPTION OF THE DRAWINGS

The present disclosure is illustrated by way of example and not limitation in the figures of the accompanying drawings, in which like references indicate similar elements.

DESCRIPTION

The description that follows includes illustrative systems, methods, techniques, instruction sequences, and computing machine program products that embody illustrative embodiments, in the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide systems and methods for managing the display of content on a display device. These embodiments discuss, by way of example, the display and management of multiple data sets in a single display device. Some embodiments describe a single menu capable of performing activities related to either of the multiple data sets. Other embodiments describe a display device that includes two display areas and a menu area that permits selection of multiple data items to present in the two display areas. The use of a single menu (or single menu area) the display area used by the menu, thereby providing increased display area for the display of data to the user.

Figure 1:
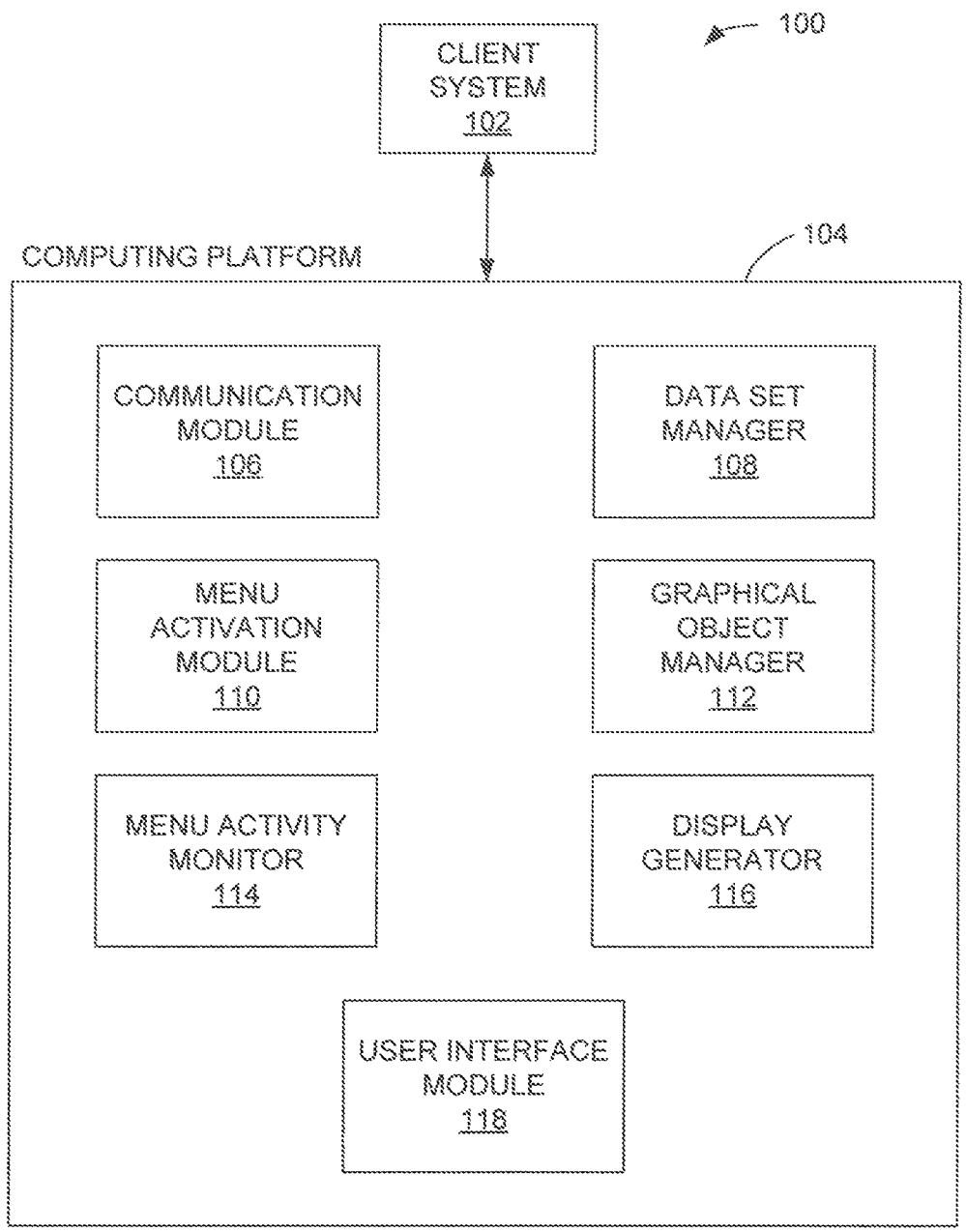
FIG. 1 is a block diagram of an example system capable of employing the systems and methods described herein.

FIG. 1 is a block diagram of an example system 100 capable of employing the systems and methods described herein. In the example of FIG. 1, a computing platform 104 is accessed by a client system 102. Although one client system 102 is shown in FIG. 1, particular embodiments may include any number of client systems 102 accessing the computing platform 104. The client system 102 includes any type of system capable of communicating with computing platform 104. For example, the client system 102 may include a server, a client computer, a desktop computer, a laptop computer, a tablet computer, a mobile device, a portable entertainment device or any other machine capable of performing one or more of the functions and operations discussed herein. The computing platform 104 includes, for example, machines and software to implement the described content management systems and methods.

In some embodiments, the client system 102 communicates with the computing platform 104 via a data communication network, such as the Internet, a local area network (LAN), wide area network (WAN), and so forth. In particular implementations, the client system 102 may be accessed or operated by a variety of users, such as an application developer, a network administrator or an end-user of an application. In other implementations, one or more functions performed by the client system 102 may be handled automatically and without user intervention.

The computing platform 104 includes a communication module 106 capable of communicating with a variety of different systems through a data communication network or other communication mechanism. For example, the communication module 106 may communicate with the client system 102, other computing platforms, content sources, data storage devices, and the like. A data set manager 108 performs various functions related to accessing, organizing, presenting, and editing various types of data. For example, the data set manager 108 identifies and stores data for presentation on a display device as discussed herein. Further, the content manager 108 modifies data based on, for example, user instructions and various menu-selected actions. As used herein, a "data set" includes any type of data, such as text data numerical data, graphical data, documents, images, spreadsheets, application data, and the like. A data set may also include any grouping or collection of data, such as different types of data grouped together in a single data set. Additionally, the terms "data set" and "set of data" are used interchangeably herein.

The computing platform 104 further includes a menu activation module 110 and a graphical object manager 112. The menu activation module 110 manages the display, selection, and operation of various menu commands or menu options) capable of being rendered by the client system 102 for presentation to a user of the client system 102. As discussed herein, various menu commands are available to manage the display of information, such as data sets. The graphical object manager 112 manages the appearance of the various menu commands (or menu options) based on user interactions with those menu commands. For example, the graphical object manager 112 may cause the display of a graphical object that allows the user to indicate how to apply a particular menu command. The computing platform 104 also includes a menu activity monitor 114 that manages the interaction between a user of the client system 102 and the various menu commands. A display generator 116 generates appropriate display information to support the display of data set information, menu commands, and the like to the user. A user interface module 118 manages various interaction between the user of client system 102 and the computing platform 104.

Figure 2:
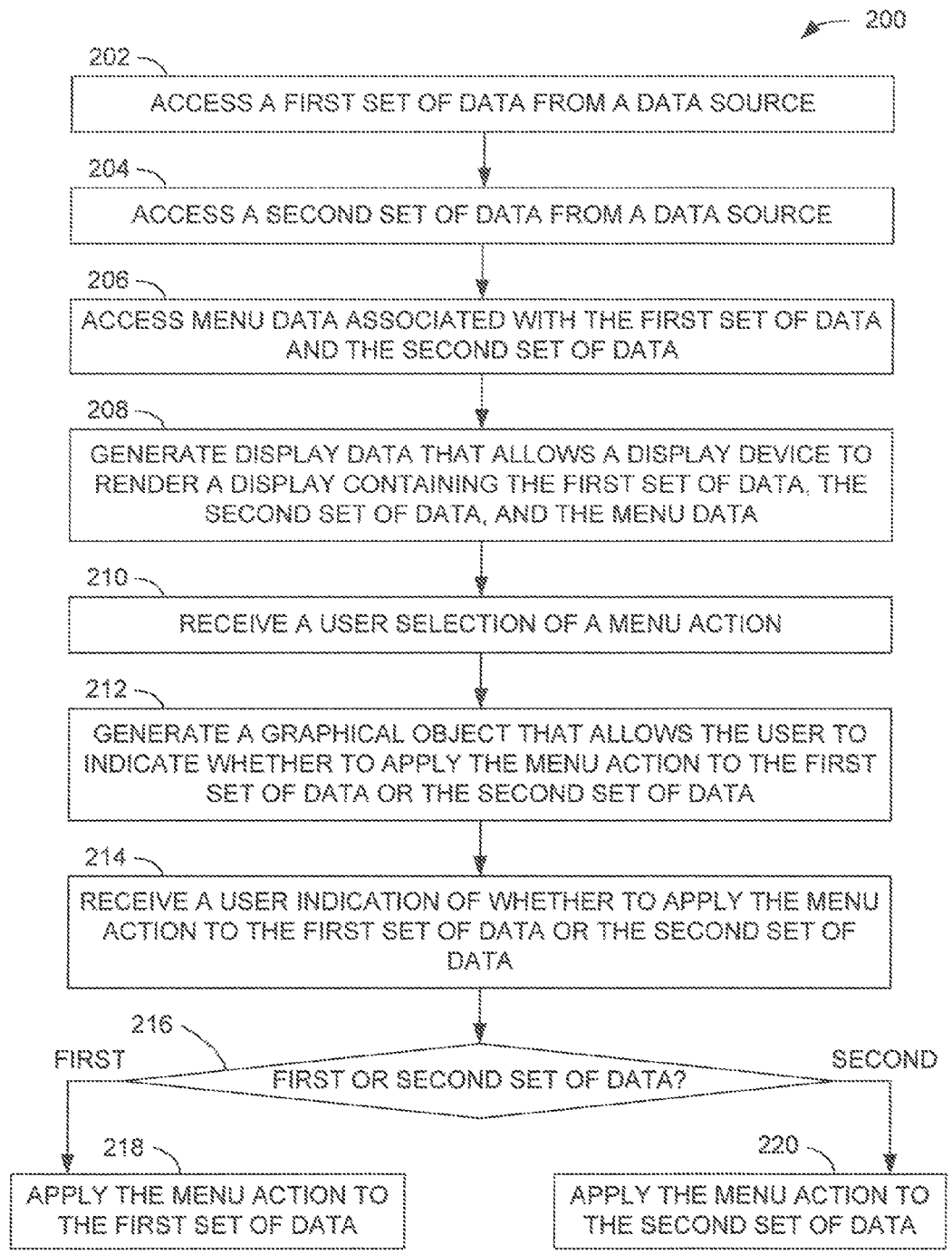
FIG. 2 is a to diagram of an example method of managing the display of two sets of data that are accessible from a single menu.

FIG. 2 is a flow diagram of an example method 200 of managing the display of two sets of data that are accessible from a single menu. Initially, the method 200 accesses a first set of data from a data source at 202. As mentioned above, a data set may include any type of data, such as text data, numerical data, graphical data, documents, images, spreadsheets, application data, and the like. The data source may be located within the computing platform 104 (FIG. 1) or external to the computing platform 104. The method 200 also accesses a second set of data from a data source at 204. The first set of data and the second set of data may be accessed from the same data source or different data sources.

The method 200 continues by accessing menu data associated with the first set of data and the second set of data at 206. The menu data includes, for example, various actions that can be performed with respect to the first set of data and the second set of data. Example actions include a copy action, a paste action, a delete action, a move action, a send action, a highlight action, a zoom action, and an execute action. The method 200 generates display data that allows a display device to render a display containing the first set of data, the second set of data, and the menu data at 208.

After presenting the various data to a user, the method 200 receives a user selection of a menu action at 210. The user may select a menu action, for example, by positioning a pointing device, such as a cursor, over the displayed menu action or by touching the displayed menu action on a touch-sensitive display screen. In response to receiving the user selection of a particular menu item, the method 200 generates a graphical object. that allows the user to indicate whether to apply the menu action to the first set of data or the second set of data at 212. As discussed below, some embodiments position the menu data (e.g., menu indicators) on the display device between the first set of data and the second set of data. Thus, the same menu indicator is used to perform an action on the first set of data or the second set of data. When the user selects a particular menu action, the graphical object allows the user to identify which set of data is associated with the selected action. As shown in FIG. 4B, the graphical object may be an arrow pointing to one or both of the Sets of data.

The method 200 then receives a user indication of whether to apply the menu action to the first set of data or the second set of data at 214. For example, the user may indicate a particular set of data by activating (clicking or touching) an arrow pointing toward the desired set of data. If the user indicates the first set of data at 216, the method 200 applies the menu action to the first set of data at 218, if the user indicates the second set of data at 216, the method 200 applies the menu action to the second set of data at 220.

Figure 3:
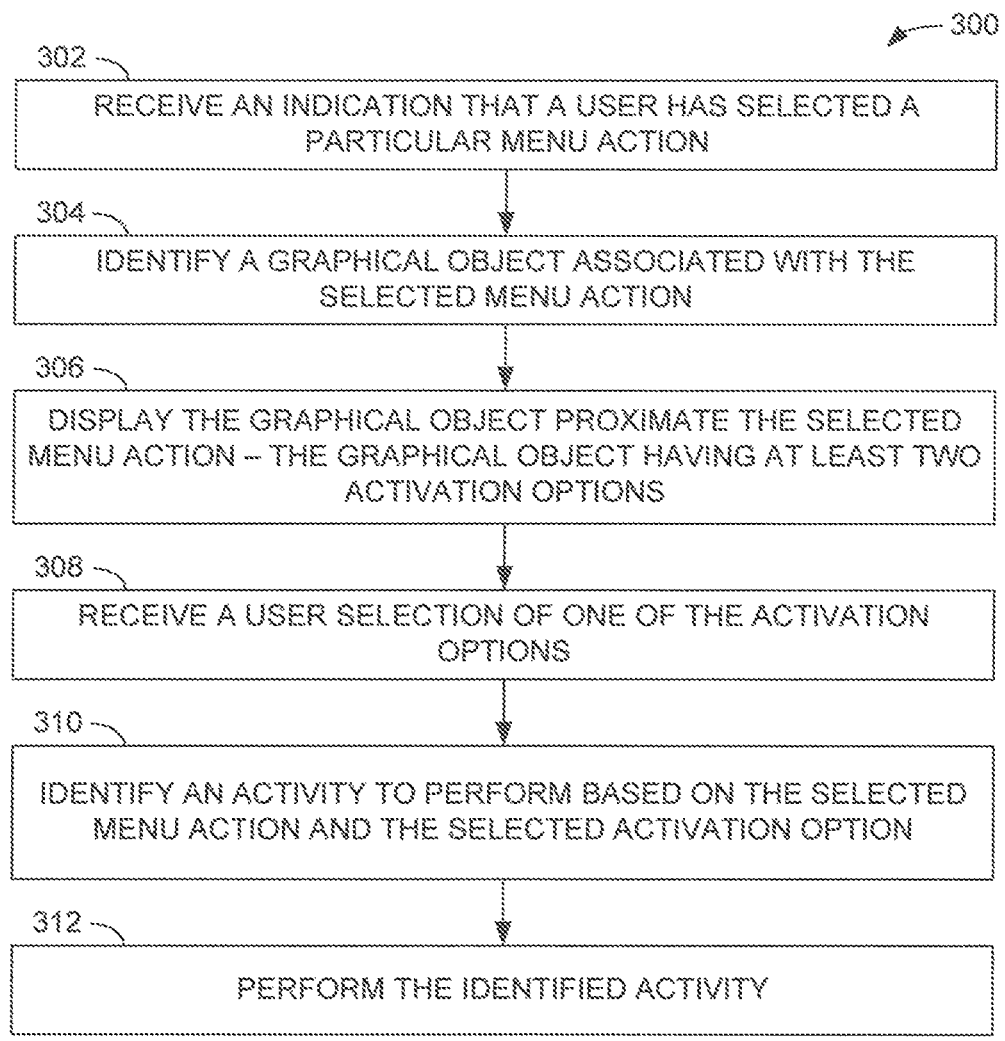
FIG. 3 is a flow diagram of an example method of displaying menu activation options to a user.

FIG. 3 is a flow diagram of an example method 300 of displaying menu activation options to a user. Initially, the method 300 receives an indication that a user has selected a particular menu action at 302. The method 300 continues by identifying a graphical object for multiple graphical objects) associated with the selected menu action at 304. As discussed herein, the graphical object may permit the user to identify which of multiple sets of data the selected menu action is to be applied. The method displays the graphical object proximate the selected menu action at 306. In some embodiments, the graphical object has at least two activation options, such as applying the selected menu action to a first set of data or applying the selected menu action to a second set of data.

The method 300 continues by receiving a user selection of one of the activation options at 308. An activity to perform is then identified based on the selected menu action and the selected activation option at 310. The method then performs the identified activity at 312.

Figure 4A:
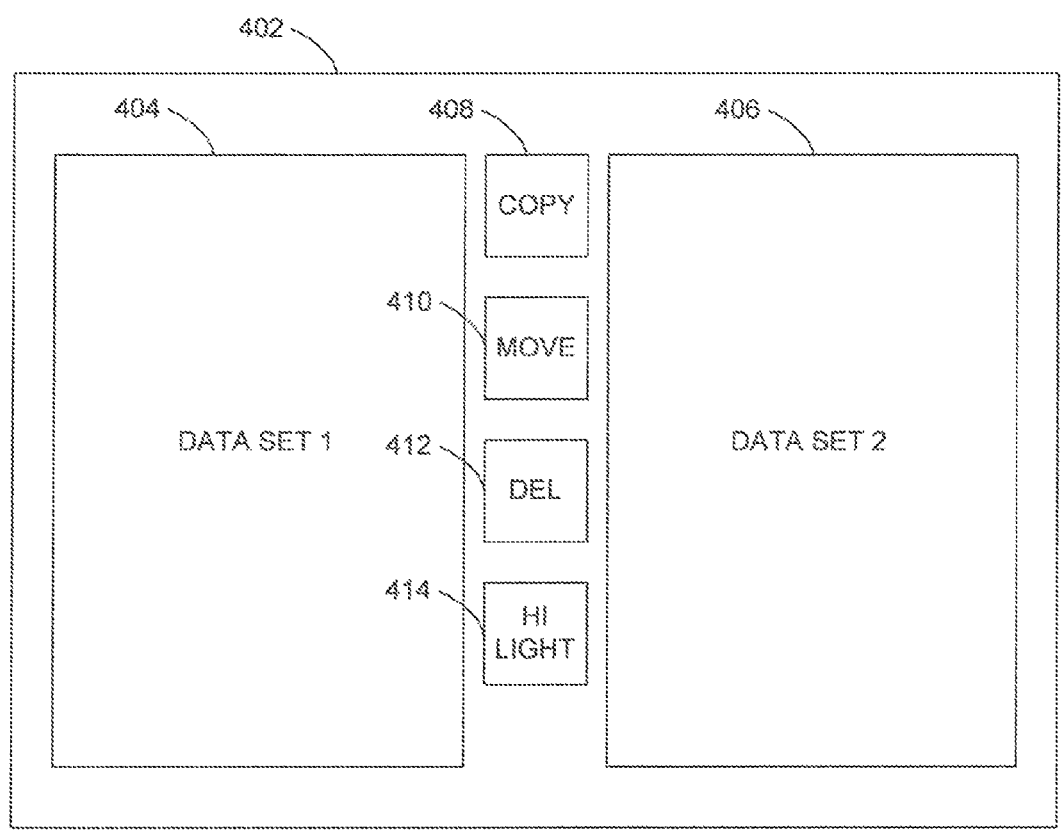
FIGS. 4A and 4B illustrate an example user interface displaying two sets of data that are accessible from a single menu.
Figure 4B:
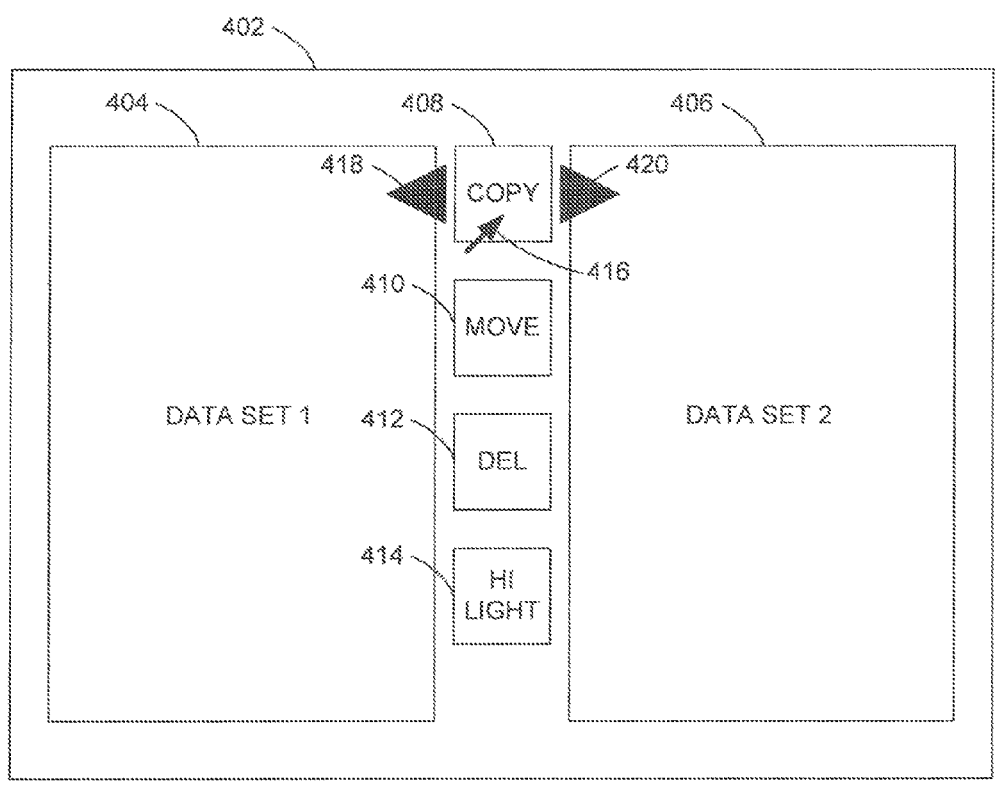

FIGS. 4A and 4B illustrate an example user interface 402 displaying two sets of data 404 and 406 that are accessible from a single menu. As discussed herein, data sets 404 and 406 may contain any type of data. ID the example use interface 402, four menu actions are shown: a copy action 408, a move action 410, a delete action 412, and a highlight action 414. In the example of FIG. 4A, each of the four menu actions 408-414 are relevant to (or applicable to) the data in both data sets 404 and 406. In other embodiments, one or more of the menu actions 408-414 are not relevant (or inapplicable) to one of the data sets 404 or 406. The menu actions 408-414 may perform activities between the two data sets 404 and 406 (e.g., copying data from data set 404 to data set 406) or between one of the data sets 404 406 and another application or data source (e.g., moving data from data set 406 to a data storage device). Although four menu actions 408-414 are shown in FIG. 4A, alternate embodiments may contain any number of different menu actions, including additional menu actions not shown in FIG. 4A.

FIG. 4B shows the example user interface 402 displaying two sets of data 404 and 406 shown in FIG. 4A, FIG. 4B also shows the four menu actions 408-414 shown in FIG. 4A. A cursor 416 controlled by a user is shown in FIG. 4B as being positioned over menu action 408. Additionally, graphical objects 418 and 420 are displayed near menu action 408 in response to the cursor 416 being positioned over menu action 408. The graphical objects 418 and 420 indicate to the user that the menu action 408 can be applied to data set 404 or data set 406. By positioning the four menu actions 408-414 between the two data sets 404, 406, a single set of menu actions 408-414 are used to manage activities in both data sets 404 and 406. The user then activates (e.g., by clicking a mouse button) either graphical object 418 or graphical object 420 to indicate which data set 404, 406 is the target of the menu action 408. In the example of FIG. 4B, use selection of graphical object 418 causes the menu action 408 to be applied to data set 404. Similarly, user selection of graphical object 420 causes the menu action 408 to be applied to data set 406.

In some embodiments, the graphical objects 418 and 420 are initially displayed when the cursor 416 is close to menu action 408. In other embodiments the graphical objects 418 and 420 are displayed when the cursor 416 is located over menu action 408. Alternatively, the graphical objects 418 and 420 may be displayed when the cursor 416 is located over menu action 408 and the user activates the cursor 416 (e.g., by clicking on a button or other activation mechanism associated with a mouse that is controlling cursor 416).

Figure 5A:
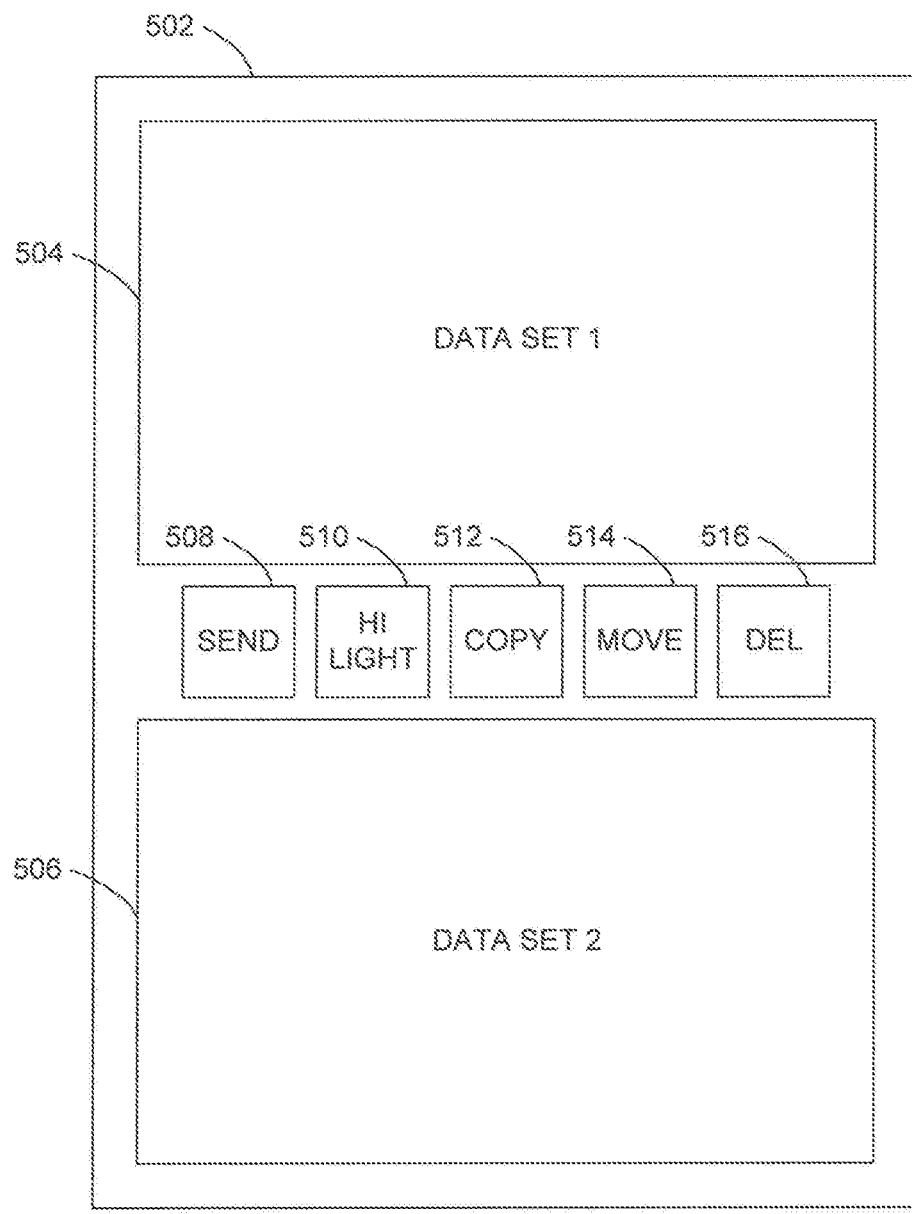
FIGS. 5A and 5B illustrate another example user interface displaying two sets of data that are accessible from a single menu.
Figure 5B:
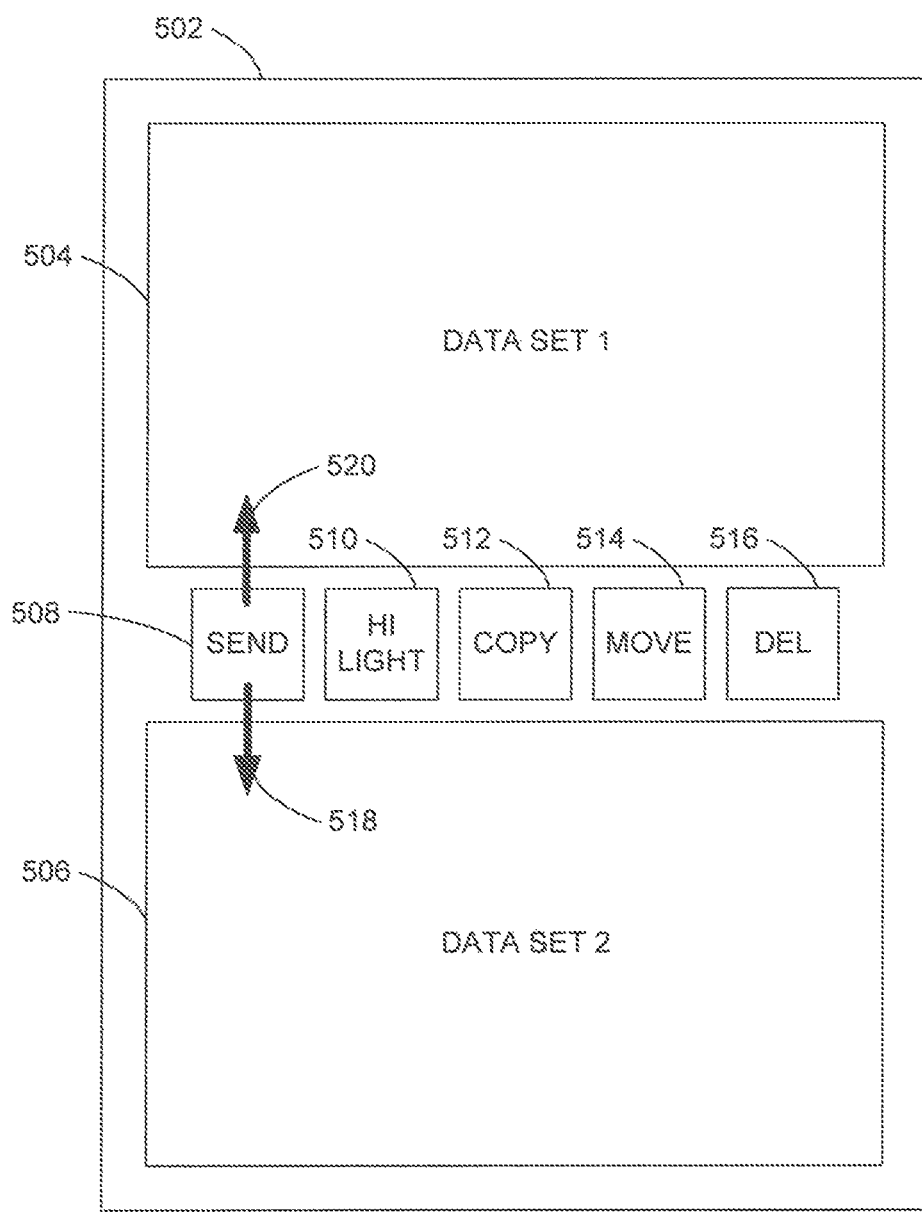

FIGS. 5A and 5B illustrate another example user interface 502 displaying two sets of data 504 and 506 that are accessible from a single menu. In the example user interface 502, five menu actions are shown: a send action 508, a highlight action 510, a copy action 512, a move action 514, and a delete action 516. In the example of FIG. 5A, each of the five menu actions 508-516 are relevant to (or applicable to) the data in both data sets 504 and 506. In other embodiments, one or more of the menu actions 508-516 are not relevant (or inapplicable) to one of the data sets 504 or 506. The menu actions 508-516 may perform activities between the two data sets 504 and 406 (e.g., moving data from data set 504 to data set 506) or between one of the data sets 504, 506 and another application or data source (e.g., sending data from data set 504 to another device or system). Although five menu actions 508-516 are shown in FIG. 5A, alternate embodiments may contain any number of different menu actions, including additional menu actions not shown in FIG. 5A.

FIG. 5B shows the example user interface 302 displaying two sets of data 504 and 506 shown in FIG. 5A. FIG. 5B also shows the five menu actions 508-516 shown in FIG. 5A. In the example of FIG. 5B, the user interface 502 is displayed on a touch-sensitive display device. A user of the touch-sensitive display device may touch any of the menu actions 508-516 to indicate a desire to perform the associated activity. In the example of FIG. 5B, the user has touched the menu action 508, which caused the display of graphical objects 518 and 520 on the user interface 502. The graphical objects 518 and 520 indicate to the user that the menu action 508 can be applied to data set 504 or data set 506 by sliding their finger in the appropriate direction. For example, if the user wants the menu action 508 to be applied to data set 506, the user slides their finger in the direction indicated by graphical object 518. If the user wants the menu action 508 to be applied to data set 504, the user slides their finger in the direction indicated by graphical object 520.

In some embodiments, the graphical objects 518 and 520 are initially displayed when the user's finger contacts the touch-sensitive display device in an area that is close to menu action 508. In other embodiments, the graphical objects 518 and 520 are displayed when the user's finger contacts the touch-sensitive display device directly over menu action 508.

Figure 6:
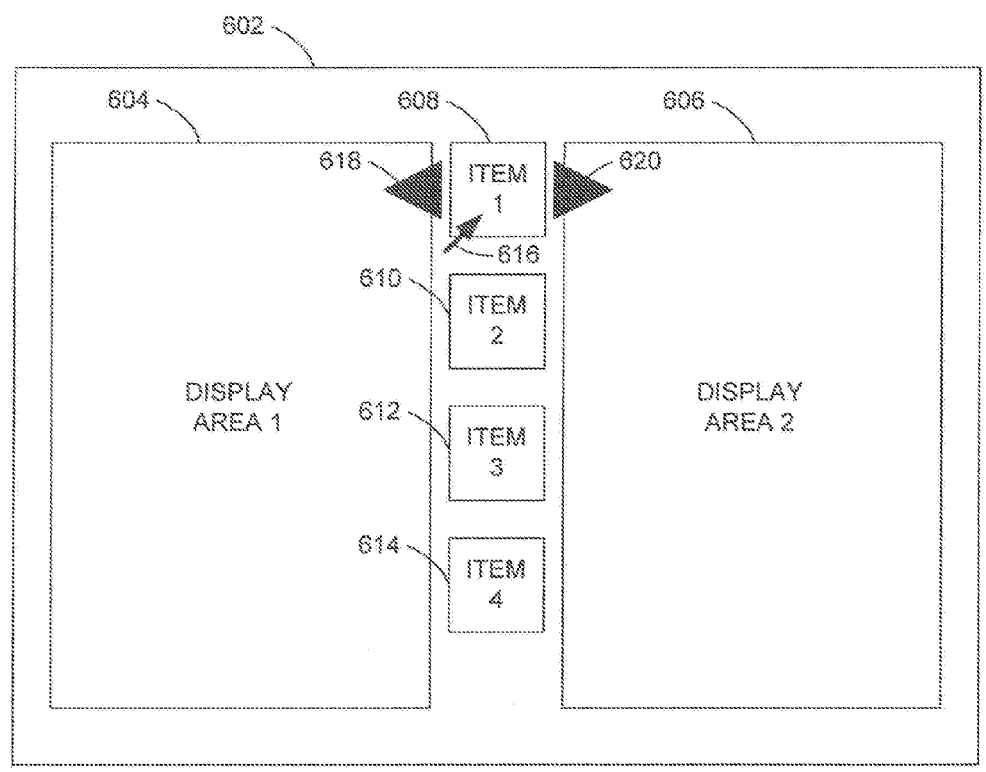
FIG. 6 illustrates an example user interface including two display areas and multiple items to present in the two display areas.

FIG. 6 illustrates an example user interface 602 including two display areas 604 and 606, and multiple data items 608, 610, 612, and 614 to present in the two display areas 604, 606. The two display areas 604 and 606 represent portions of the user interface 602 that can display various types of data, such a the data associated with data items 608-614. For example, a user may compare data item 608 with data hem 610 by placing one of the data items in the display area 604, and the other data item in the display area 606. Although four data items 608-614 are shown in FIG. 6, alternate embodiments may include any number of different data items for display in the display areas 604 and 606. Data items 608-614 include any type of data, such as text, spreadsheets, graphs, photographs, video content, and the like.

FIG. 6 also illustrates a cursor 616, which is controlled by a user to be positioned over data item 608. Additionally, graphical objects 618 and 620 are displayed near data item 608 in response to the cursor 616 being positioned over data item 608. The graphical objects 618 and 620 indicate to the user that the data item 608 can be displayed in the display area 604 or in the display area 606. The user then activates (e.g., by clicking a mouse button) either graphical object 618 or graphical object 620 to indicate which display area 604, 606 to display data item 608. In the example of FIG. 6, user selection of graphical object 618 causes data item 608 to be displayed in the display area 604. Similarly, user selection of graphical object 620 causes data item 608 to be displayed in the display area 606.

In some embodiments the graphical objects 618 and 620 are initially displayed when the cursor 616 is close to data item 608. In other embodiments, the graphical objects 618 and 620 are displayed when the cursor 616 is located over data item 608. Alternatively, the graphical objects 618 and 620 may be displayed when the cursor 616 is located over data item 608 and the user activates the cursor 616 (e.g., by clicking on a button or other activation mechanism associated with a mouse that is controlling cursor 616).

Figure 7:
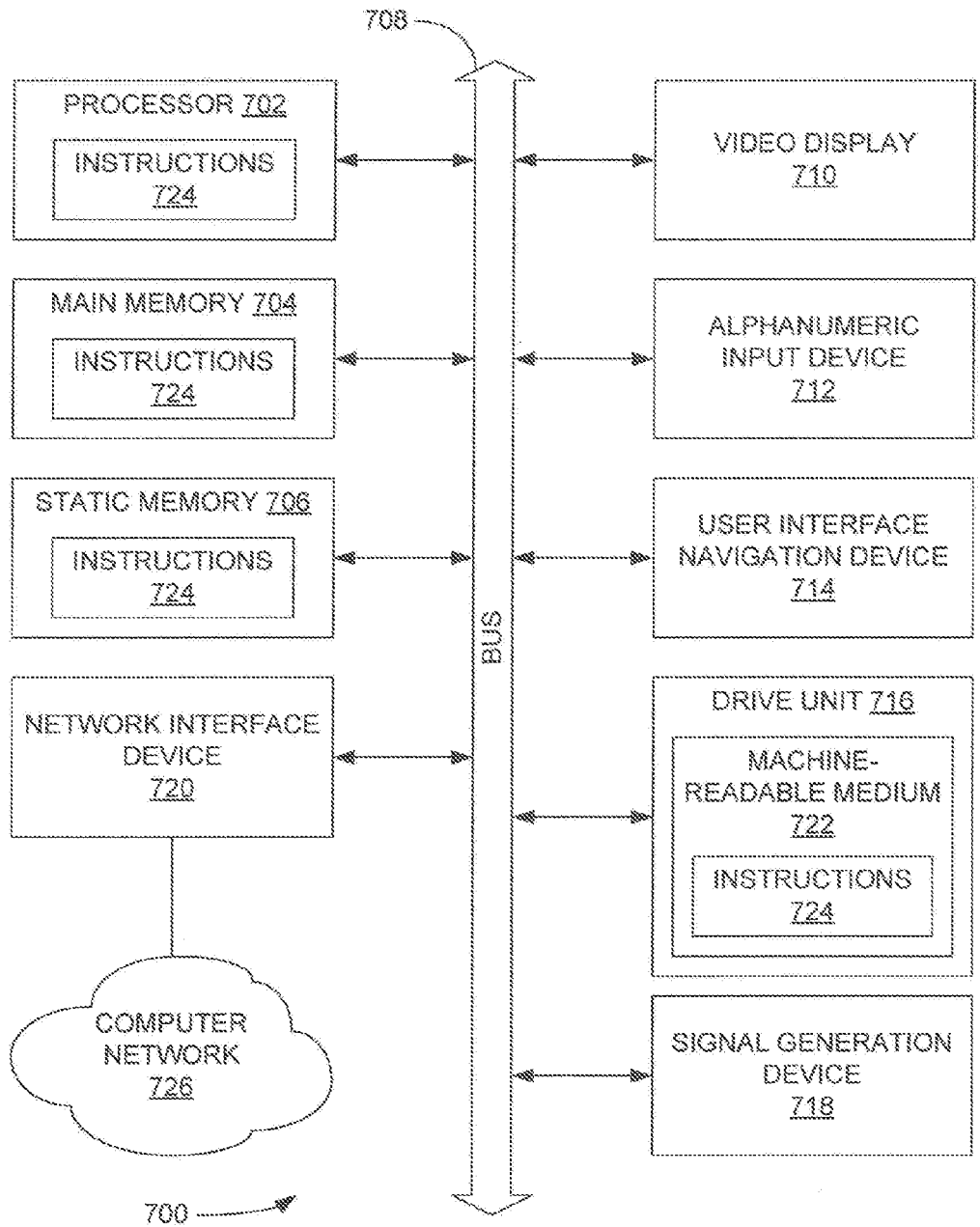
FIG. 7 depicts a block diagram of a machine in the example form of a processing system within which may be executed a set of instructions for causing the machine to perform an one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (for example, networked) to other machines, in a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (for example, a central processing unit (CPU), a graphics processing unit (CPU), or both), a main memory 704 (for example, random access memory), and static memory 706 (for example, static random-access memory), which communicate with each other via bus 708. The processing system 700 may further include video display unit 710 (for example, a plasma display, a liquid crystal display (LCD), or a cathode ray tube (CRT)). The processing system 700 also includes an alphanumeric input device 712 (for example, a keyboard), as user interface (UI) navigation device 714 (for example, a mouse), a disk drive unit 716, a signal generation device 718 (for example, a speaker), and a network interface device 720.

The disk drive unit 716 (a type of nonvolatile memory storage) includes a machine-readable medium 722 on which s stored one or more sets of data structures and instructions 724 (for example, software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 726 via network interface device 720 utilizing any one of a number of well-known transfer protocols (for example, HyperText Transfer Protocol (HTTP)).

Certain embodiments are described herein as including logic or is number of components, modules, or mechanisms. Modules may constitute either software modules (for example, code embodied on a machine-readable medium or in a transmission signal or hardware modules. A hardware module is a tangible unit capable of performing certain operations and may be configured or arranged in a certain manner, in example embodiments, one or more combiner systems for example, the processing system 700) or one or more hardware modules of a computer system (for example, a processor 702 or a group of processors) may be configured by software for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different Instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations or example methods described herein may be performed, at least partially, by one or more processors 702. that are temporarily configured (the example, by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor implemented modules. The performance of certain of the operations may be distributed among the one or more processors 702, not only residing within a single machine but deployed across a number of machines, in some example embodiments, the processors 702 may he located in a single location for example, within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific, illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A computer-implemented method comprising:
    accessing a first set of data;
    accessing a second set of data;
    accessing menu data associated with a plurality of menu actions, at least one of the menu actions is relevant to data in both the first set of data and the second set of data;
    generating display data that allows a single display device having multiple display areas to present the first set of data in a first one of the multiple display areas, the second set of data in a second one of the multiple display areas, and the menu data in a third one of the multiple display areas such that the menu data is positioned between the first set of data and the second set of data;
    receiving a user selection of a menu action; and
    responsive to receiving the user selection of the menu action, generating, using one or more processors, a graphical object displaying activation options for the first set of data and the second set of data that allows the user to indicate whether to apply the menu action to the first set of data or the second set of data.

2. The method of claim 1, further comprising:
    receiving a user indication of whether to apply the menu action to the first set of data or the second set of data; and
    applying the menu action to the first set of data or the second set of data responsive to the user indication.

3. The method of claim 1, wherein the menu action includes at least one of a copy action, a paste action, a delete action, a move action, a send action, a highlight action, a zoom action, and an execute action.

4. The method of claim 1, wherein the graphical object includes a first pointer identifying the first set of data and a second pointer identifying the second set of data.

5. The method of claim 4, wherein the graphical object further includes a first selection area associated with the first pointer and a second selection area associated with the second pointer.

6. The method of claim 1, wherein the graphical object is displayed proximate the selected menu action.

7. The method of claim 1, wherein the menu is adjacent to both the first set of data and the second set of data.

8. The method of claim 1, wherein the first set of data and the second set of data are accessed from a common data source.

9. The method of claim 8, wherein the menu data is accessed from the common data source.

10. The method of claim 1 wherein the user selection of the menu action includes touching the single display device proximate the menu action.

11. The method of claim 1, wherein the user selection of the menu action includes positioning a pointing, device proximate the menu action.

12. A computer-implemented method comprising:
accessing a first set of data;
accessing a second set of data;
accessing menu data associated with a plurality of menu actions, at least one of the menu actions is relevant to data in both the first set of data and the second set of data;
generating display data that allows a single display device having multiple display areas to present the first set of data in a first one of the multiple display areas, the second set of data in a second one of the multiple display areas, and the menu data in a third one of the multiple display areas such that the menu data is positioned between the first set of data and the second set of data;
receiving a user selection of a menu action;
responsive to receiving the user selection, generating, using one or more processors, data that allows the single display device to render a graphical object displaying activation options for the first set of data and the second set of data that allows the user to indicate whether to apply the menu action to the first set of data or the second set of data;
receiving a user selection indicating the first activation option or the second activation option; and
identifying an activity to perform based on the selected menu action and the selected activation option.

13. The method of claim 12, wherein the graphical object is displayed proximate the selected menu action.

14. The method of claim 12, further comprising performing the identified activity.

15. The method of claim 12, wherein the menu action includes at least one of a copy action, a paste action, a delete action, a move action, a send action, a highlight action, a zoom action, and an execute action.

16. The method of claim 12, wherein the first activation option is a first pointer identifying the first set of data, and wherein the second activation option is a second pointer identifying the second set of data.

17. The method of claim 12, wherein the user selection of the menu action includes touching the single display device proximate the menu action.

18. The method of claim 12, wherein the user selection of the menu action includes positioning a pointing device proximate the menu action.

19. An apparatus comprising:
an interface configured to communicate with a user of the apparatus;
a memory configured to store data; and
one or more processors coupled to the interface and the memory, the one or more processors configured to:
access menu data, the menu data associated with a plurality of data items capable of display in a first display area and a second display area on a single display device, the single display device having multiple display areas including the first display area, the second display area, and a third display area;
generate display data that allows the single display device to present the menu data in the third display area to the user such that the menu data is positioned between the first display area and the second display area;
receive a user selection of a data item associated with the menu data; and
responsive to the received user selection of the data item, generate a graphical object displaying activation options for the user selected data item that allows the user to indicate whether to display the data item in the first display area or the second display area.

20. The apparatus of claim 19, wherein the graphical object includes a first pointer identifying the first display area and a second pointer identifying the second display area.

* * * * *